Jan. 4, 1938.    S. C. BARNES    2,104,217
HANDLE ASSEMBLY ESCUTCHEON
Filed July 1, 1935
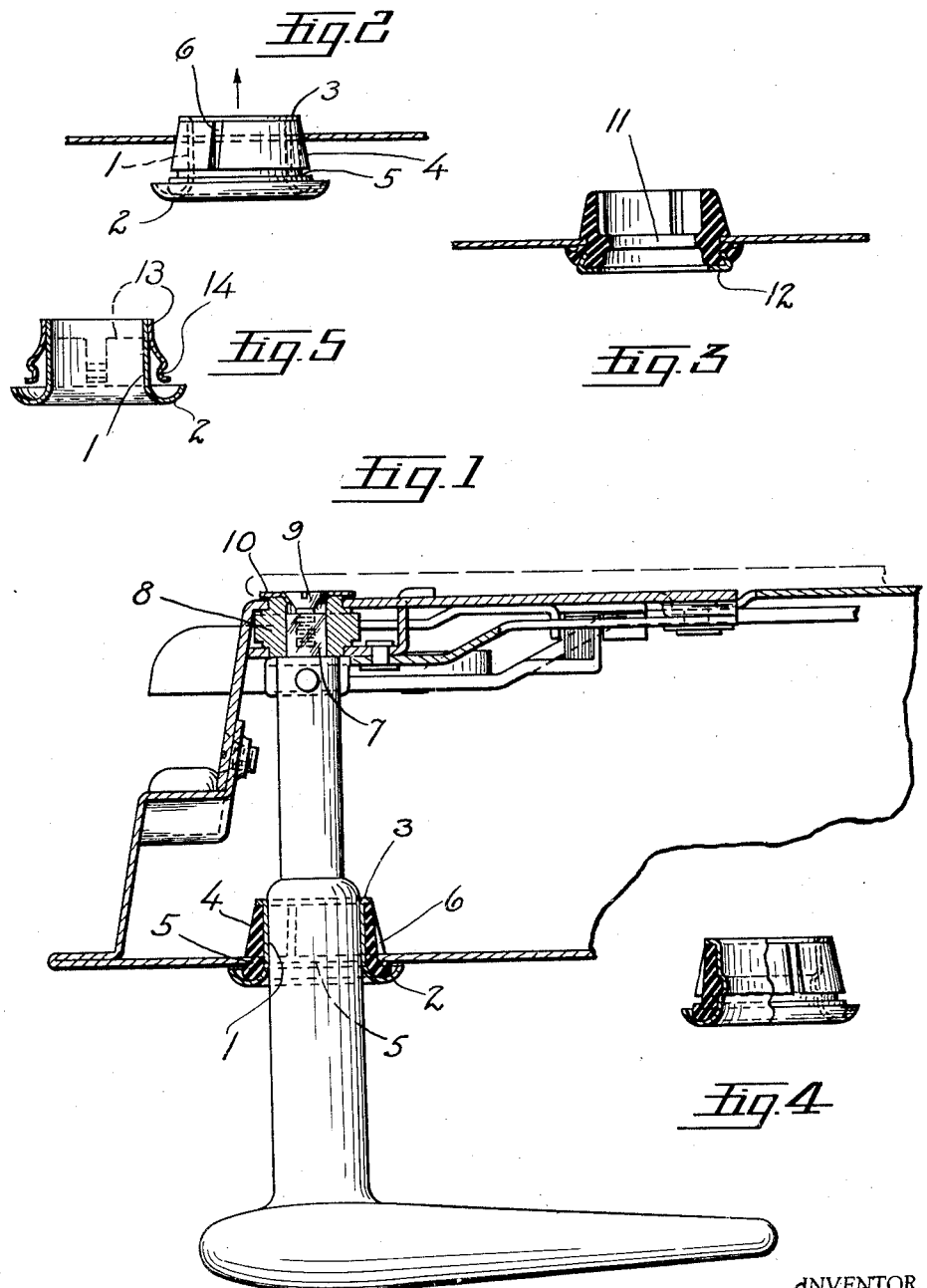

Patented Jan. 4, 1938

2,104,217

UNITED STATES PATENT OFFICE 2,104,217

HANDLE ASSEMBLY ESCUTCHEON

Stuart C. Barnes, Detroit, Mich.

Application July 1, 1935, Serial No. 29,237

16 Claims. (Cl. 292—356)

This invention relates to handle assembly escutcheons or bushings, particularly for coach latches or locks.

It is the object of my invention to provide an improved escutcheon which provides a substantially non-wearing metal bearing that fairly accurately fits the handle stem and in which the bearing is floated in a yieldable material in the opening in the door panel to accommodate misalignment of the handle with respect to the opening through the door and to deaden any vibration between the handle and its bushing. Furthermore, the bushing is a self-anchoring bushing which accurately and uniformly locates itself at all times. These and other objects will appear from the description that follows.

In the drawing:

Fig. 1 is a cross section through the edge of an automobile door showing the lock, the handle, and the bushing.

Fig. 2 is a detail showing how the bushing can be located.

Fig. 3 is a cross section showing another form of the bushing.

Fig. 4 shows a slight modification of the form shown in Figures 1 and 2 showing the material slightly bumped out to lessen the area of contact of the handle with the bushing.

Fig. 5 is a sectional view of another modification.

The bushing comprises a metal sleeve 1 with a turned out ornamental flange or annulus 2, and a flange 3 at the inner end to retain the rubber block 4. This block is in the form of an annulus which is slightly tapered toward the inner end and which is provided with an annular groove 5. The turned up inner flange 3 retains the block in place. The groove 5 permits the bushing to be applied to the door before the handle is put in by simply driving it in with a wooden shouldered arbor. The grooves 6 divide the rubber block into segments which make it fairly easily distortable to permit its being driven home.

This bushing can be made of solid easily distortable rubber or it may be even made of a sponge rubber or a yieldable composition material which may be deformed, such as hard felts, pulps, soft fiber, etc. But a fairly solid but yieldable rubber I find to be most suitable. After the bushing is in place, the handle may be threaded through the bushing and the squared end 7 through the squared opening in the roll-back 8, to which it is secured by a screw and a washer 9 and 10, respectively.

Figure 3 shows a modified form in which the inner metal sleeve is omitted and the door handle will rest on an internal annular rib of rubber or other yieldable material 11. Preferably an ornamental metal bead or ring 12 is moulded into the outer end of the rubber to improve the appearance of the bushing.

Either one of these bushings is self-anchoring in the sense that it simply has to be pushed in place and it anchors itself. Furthermore, it is self-locating since it automatically takes up its properly assigned location without any guessing by the workman. It may be fairly easily removed from the job after the handle is taken out if for any reason removal is desirable.

The drawing, (Figures 1 and 2), shows the full length of the bushing fitting around the spindle or handle stem. If the run of misalignments is such that the handles are considerably off the center of the hole in the panel, it may be desirable to not have the sleeve contact the handle stem for so great an area, because the load on one side of the handle by reason of the distortion of the rubber may be considerable, hence, I have found that a small pressed in annulus may serve the purpose better or even pressed in points. This is shown in Figure 4.

In Figure 5 I have shown a modification in which the rubber block is replaced by a spider 13 of diverging spring arms 12, which spider is spot welded or brazed to the sleeve.

It will be noticed from Figs. 2 and 4 that the annular groove into which the edge of the opening through the door panel fits is located somewhat to the rear of the ornamental outside flange 2 of the bushing. Hence, when the bushing is in place, the outer flange is ordinarily somewhat spaced from the metal door panel unless the misalignment is so great that a considerable distortion of the rubber sleeve is necessary. So this arrangement will ordinarily completely sound-insulate the bushing from the door panel. Hence, if there be any small looseness of fit of the handle spindle in the bushing, any noise due to vibration will not be transmitted to the metal door panel and magnified thereon by the sounding board thus provided.

What I claim is:

1. In a handle assembly, a handle bushing in combination with a door panel having an aperture and a fixed lock with an outside handle stem and a roll-back having an aperture therein for the said handle stem and comprising a sleeve arranged to rotatably support the handle stem in its various positions of misalignment with respect to the center of the door aperture and surrounded with resilient means capable of yieldingly floating and anchoring the bushing in the door panel and in which the yieldable portion is distortable to compensate for the misalignment.

2. In a handle assembly, a handle bushing for use in combination with a door panel having an aperture and a lock with an outside handle stem passing therethrough and a roll-back adapted to be fastened to the end of the stem, having a sleeve portion arranged to fit and support the handle stem to turn therein and having a yieldable portion which yieldingly floats the sleeve in the aperture to accommodate misalignments of the handle stem because of the location of the roll-back aperture for the handle stem and which yielding portion permits the snapping of the bushing in place by pressing it into the aperture.

3. In a handle assembly, a handle bushing for use in combination with a door panel having an aperture and a lock with an outside handle stem passing therethrough and a roll-back adapted to be fastened to the end of the stem, having a sleeve portion arranged to support the handle stem to turn therein and having a yieldable portion which yieldingly floats the sleeve in the aperture to accommodate misalignments of the handle stem anchored in the roll-back and which yielding portion is provided with an annular groove and is tapered toward the inner end to permit the anchorage of the bushing by pushing the same through the aperture to permit the edge of the aperture to pass into the annular groove of the yielding material.

4. In a handle assembly, a bushing for use in combination with a door panel having an aperture therein and a lock with an outside handle stem passing therethrough and a roll-back adapted to be fastened to the end of the stem, comprising a sleeve of rigid material arranged to fit over the handle stem and support the same to turn therein and yielding means surrounding said sleeve for yieldingly floating the sleeve in the aperture and permitting the bushing to accommodate misalignment of the handle stem with respect to the aperture when it is anchored in the roll-back.

5. In a handle assembly and for use in combination with a door panel provided with an aperture and a lock with an outside handle stem passing therethrough and a roll-back adapted to be fastened to the end of the stem, a bushing of rigid material with an exterior ornamental head and yielding means surrounding and secured to said bushing arranged to float the bushing yieldingly in the aperture to accommodate misalignment of the handle stem with respect to the aperture when it is anchored in the roll-back, said yielding means arranged to snap behind the panel and anchor the bushing in place when pushed into the aperture.

6. In a handle assembly and for use in combination with a door panel provided with an aperture and a lock with an outside handle stem passing therethrough and a roll-back adapted to be fastened to the end of the stem, a tapered rubber block arranged to support a handle stem and accommodate misalignment of the same with respect to the aperture when the handle stem is anchored in the roll-back, the said block arranged to fit into the aperture of the door panel.

7. In a handle assembly and for use in combination with a metal door panel, a bushing comprising a metal sleeve for supporting the handle stem to turn therein, and a rubber block arranged around the sleeve for yieldingly supporting the metal sleeve in the aperture of the panel so as to accommodate misalignment of the handle stem with respect to the aperture when the handle stem is anchored in the roll-back.

8. In a handle assembly, a bushing for use in combination with a door panel with an aperture and a lock with an outside handle stem passing therethrough and a roll-back adapted to be fastened to the end of the stem, comprising a metal sleeve arranged to fit around the handle stem and permitting turning of the stem therein, a rubber block fitted around the sleeve, tapered toward the inner end and provided with an annular groove, said bushing being capable of anchorage in the aperture by pushing the same therein and permitting the rubber block to be distorted while the edges of the aperture fit into the annular groove.

9. In a handle assembly and for use in combination with a door panel with an aperture therein and a lock with an outside handle stem passing therethrough and a roll-back adapted to be fastened to the end of the stem, a bushing having a metal sleeve with a turned out ornamental flange at the outer edge of the sleeve, the said sleeve arranged to fit around and rotatably support the handle stem and a yieldable block secured on the outside of the sleeve and comprising a tapered member with an annular groove which permits the bushing to be driven into the aperture and the yieldable block to snap around the edges of the door panel to anchor the bushing in place.

10. In a handle assembly and for use in combination with a metal panel having an aperture and a lock with an outside handle stem passing therethrough and a roll-back adapted to be fastened to the end of the stem, a bushing provided with a rigid sleeve portion adapted to fit around and permit the turning of the handle stem therein and a yieldable block tapered towards its inner end secured to the outside of the rigid sleeve, and adapted to yieldingly support the sleeve in the aperture and the said bushing being thereby snapped in place when the bushing with the yieldable block is driven into the aperture.

11. In a handle assembly and for use in combination with a door panel having an aperture and a lock with an outside handle stem passing therethrough and a roll-back adapted to be fastened to the end of the stem, a bushing provided with a rigid sleeve having a flanged outer end and having secured on its outside a yieldable tapered block with an annular groove, said yieldable block floating the sleeve in the aperture to accommodate misalignments of the handle stem and the annular groove permitting the bushing with the yieldable member to be driven into the aperture and snapped into place.

12. In a handle assembly, a bushing comprising a metal sleeve arranged to rotatably support the handle stem and means for floating and anchoring the sleeve in an aperture of a door panel, comprising a plurality of spring arms secured to the stem.

13. In a handle assembly, a bushing comprising a metal sleeve arranged to rotatably support the handle stem and means for floating and anchoring the sleeve in an aperture of a door panel, comprising a spider secured to the metal sleeve and provided with a plurality of diverging spring arms having recesses and adapted to snap behind the metal of the aperture in the door panel.

14. In a door handle assembly for use in combination with a metal door panel having a handle spindle opening therethrough, a bushing comprising a metal sleeve having at the outer end a turned over flange for exposure on the outside of the door, and a turned out portion on the inner end of the sleeve, and a sleeve of yieldable material held between said turned out elements, fitted around the metal sleeve and provided with a thickened portion at its outer end arranged to abut against the outer turned out flange and lie between said flange and the outside of the door panel when the bushing is in place, the yieldable material of the yieldable sleeve contacting the door panel on the outside and inside of the panel and in the wall of the opening through the panel to yieldingly float the said metal bushing in the door panel.

15. In a handle assembly for metal door panels, an outside door handle bushing, comprising a metal sleeve arranged to fit fairly closely around the handle stem and rotatably support the same, said sleeve having a turned out flange at its outer end and a turned out portion at its inner end and a rubber sleeve adapted to fit about the outside of the metal sleeve between the two turned out portions and to bear on the outside and inside of the door panel and thereby adapted to serve to yieldably support the metal sleeve in the metal door panel.

16. In a handle assembly for metal door panels, a bushing comprising a flanged metal sleeve and a rubber sleeve surrounding the metal sleeve and retained thereon and provided with an annular groove, the said rubber sleeve being adapted to snap into the opening in the door panel and the panel edge surrounding said opening then resting in the annular groove when the bushing is in place, said rubber sleeve serving to float the metal sleeve in the door panel.

STUART C. BARNES.